United States Patent
Carpentier et al.

(10) Patent No.: US 7,373,345 B2
(45) Date of Patent: May 13, 2008

(54) ADDITIONAL HASH FUNCTIONS IN CONTENT-BASED ADDRESSING

(75) Inventors: Paul R. M. Carpentier, Boechout (BE); Peter Forret, Brussels (BE); Maarten J. P. A. Willems, Leuven (BE)

(73) Assignee: Caringo, Inc., Austin, TX (US)

( * ) Notice: Subject to any disclaimer, the term of this patent is extended or adjusted under 35 U.S.C. 154(b) by 470 days.

(21) Appl. No.: 10/782,137

(22) Filed: Feb. 19, 2004

(65) Prior Publication Data

US 2004/0220975 A1    Nov. 4, 2004

Related U.S. Application Data

(60) Provisional application No. 60/449,172, filed on Feb. 21, 2003.

(51) Int. Cl.
*G06F 17/30* (2006.01)
*G06F 7/00* (2006.01)

(52) U.S. Cl. .......................... 707/9; 707/205
(58) Field of Classification Search ............ 707/9, 707/205, 1, 204, 4, 102, 101, 5, 6
See application file for complete search history.

(56) References Cited

U.S. PATENT DOCUMENTS

| | | | |
|---|---|---|---|
| 4,741,028 A * | 4/1988 | Frimmel et al. | 379/355.1 |
| 4,807,182 A * | 2/1989 | Queen | 715/511 |
| 5,255,270 A | 10/1993 | Yanai | |
| 5,454,100 A | 9/1995 | Sagame | |
| 5,690,452 A | 11/1997 | Baublits | |
| 5,742,807 A * | 4/1998 | Masinter | 707/1 |
| 5,978,791 A | 11/1999 | Farber | |
| 6,138,237 A * | 10/2000 | Ruben et al. | 726/21 |

(Continued)

FOREIGN PATENT DOCUMENTS

WO    WO 99/38092    7/1999

(Continued)

OTHER PUBLICATIONS

PCT International Search Report dated Feb. 11, 2004; International Apl. No. PCT/IB2004/000420; Filing date Feb. 19, 2004.

(Continued)

*Primary Examiner*—Kuen S Lu
(74) *Attorney, Agent, or Firm*—Beyer Law Group LLP

(57) ABSTRACT

A hash function used for content addressing is different from the hash function used for content verification. Adding a file to a database involves storing both hash function values in a table as pair. Verifying the integrity of a file believed to be a duplicate in a database, or when retrieving a file, makes use of the verification hash function. Files can be continuously checked. A multi-level database can be used. A second hash function can be added to an existing system. A verification hash function can be upgraded and more than one content verification hash function can be used. In a variation, a random number generator is used instead of a hash function for content addressing; the verification hash function is also used. Files addressed using a random number are added or retrieved from a database and their verification hash values are checked. Time stamps and digital signatures are used for security.

7 Claims, 15 Drawing Sheets

U.S. PATENT DOCUMENTS

| | | | |
|---|---|---|---|
| 6,151,659 | A | 11/2000 | Solomon |
| 6,415,280 | B1 | 7/2002 | Farber |
| 6,480,931 | B1 | 11/2002 | Buti |
| 6,523,130 | B1 | 2/2003 | Hickman |
| 6,658,589 | B1 | 12/2003 | Taylor |
| 6,715,048 | B1 | 3/2004 | Kamvysselis |
| 6,757,790 | B2 | 6/2004 | Chalmer |
| 6,763,446 | B1 | 7/2004 | Kemeny |
| 6,826,711 | B2 | 11/2004 | Moulton |
| 6,877,072 | B1 | 4/2005 | Dias |
| 6,912,548 | B1 | 6/2005 | Black |
| 6,928,442 | B2 | 8/2005 | Farber |
| 6,978,282 | B1 | 12/2005 | Dings |
| 7,047,359 | B1 | 5/2006 | Van Krevelen |
| 7,058,772 | B2 | 6/2006 | Kuwabara |
| 7,062,648 | B2 | 6/2006 | Moulton |
| 7,065,610 | B1 | 6/2006 | Black |
| 7,082,441 | B1 | 7/2006 | Zahavi |
| 7,100,008 | B2 | 8/2006 | Yagawa |
| 7,113,945 | B1 | 9/2006 | Moresket |
| 7,114,027 | B2 | 9/2006 | Gilfix |
| 7,124,305 | B2 | 10/2006 | Margolus |
| 7,155,466 | B2 | 12/2006 | Rodriquez |
| 7,162,571 | B2 | 1/2007 | Kilian |
| 2001/0027450 | A1* | 10/2001 | Shinoda et al. ............... 707/1 |
| 2002/0029347 | A1* | 3/2002 | Edelman ................... 713/193 |
| 2002/0073068 | A1 | 6/2002 | Ramanathan |
| 2003/0005306 | A1* | 1/2003 | Hunt et al. ................ 713/181 |
| 2003/0009538 | A1* | 1/2003 | Shah et al. ................ 709/219 |
| 2003/0188180 | A1* | 10/2003 | Overney ................... 713/193 |
| 2004/0111608 | A1* | 6/2004 | Oom Temudo de Castro et al. ........................ 713/156 |
| 2005/0187970 | A1* | 8/2005 | Goodwin et al. ........ 707/104.1 |

FOREIGN PATENT DOCUMENTS

| | | |
|---|---|---|
| WO | WO 99/38093 | 7/1999 |
| WO | WO 01/18633 | 3/2001 |

OTHER PUBLICATIONS

Peyravian M et al. "On Probabilities of Has Value Matches"; Computer & Security, Elsevier Science Publishers. Amsterdam, NL, vol. 17, No. 2, Mar. 1, 1998, pp. 171-176, XP004115884; ISSN: 0167-4048 p. 171, p. 172, left-hand column.

Gutmann P: "A Reliable, Scalable General-purpose Certificate Store"; Computer Security Applications, 2000. ACSAC '00. 16th Annual Conference New Orleans, LA; Dec. 11-15, 2000, Los Alammitos, CA; IEEE Comput. Soc, Dec. 11, 2000; pp. 278-287, XP010529825; ISBN: 0-7695-0859-6; p. 282, left-hand column.

Ramakrishna M V Ed—Koczkodaj W W et al.: "A Simple Perfect Hashing Method for Static Sets"; Computing and Information, 1992. Proceedings, ICCI '92., 4TH International Conference on Toronto, Ont., Canada May 28-30, 1992, Los Alamitos, CA; IEEE Comput. Soc; May 28, 1992, pp. 401-404. XP010028759; ISBN: 0-8186-2812-X; p. 401, left-hand column; p. 402, left-hand column.

* cited by examiner

Multi-Level Database

| AH (802) | VH (804) | VH' (806) | Timestamp (808) | Digital Signature (810) |
|---|---|---|---|---|
|  |  |  |  |  |
| ... | ... | ... | ... | ... |

| R (842) | VH (844) | Actual Address (846) | Timestamp (848) | Digital Signature (850) |
|---|---|---|---|---|
|  |  |  |  |  |
|  |  |  |  |  |
|  |  |  |  |  |

| Random No. (504) | Verification Hash Value (508) | Actual Address (512) | |
|---|---|---|---|
| R for File W | VH of File W | | 514 |
| R for File X | VH of File X | | 516 |
| R for File Y | VH of File Y | | 518 |
| R for File Z | VH of File Z | R of File X | 520 |
| ... | ... | ... | |

Identifier Authority Table

ADDITIONAL HASH FUNCTIONS IN CONTENT-BASED ADDRESSING

This application claims priority of U.S. provisional patent application No. 60/449,172, filed Feb. 21, 2003 entitled "Hash Authorities in Content-based Addressing," which is hereby incorporated by reference.

FIELD OF THE INVENTION

The present invention relates generally to the storage and retrieval of information using a computer. More specifically, the present invention relates to use of hash functions and random numbers to identify and verify the contents of computer files.

BACKGROUND OF THE INVENTION

The prior art includes the concept of content-addressable storage of digital information, its retrieval, and the use of hash functions, message digests and descriptor files, as described in international publication No. WO 99/38093. International publication No. WO 99/38092 describes a particular technique for the storage and access of content-addressable information, and international publication No. WO 01/18633 describes a technique for encrypting content-addressable information. These publications are all incorporated by reference.

As discussed in the prior art, it is apparent that content-addressable techniques can be very useful for storing and accessing documents in a fashion that guarantees the integrity of the stored content. As discussed in the prior art, one technique is to use a message digest (such as an "MD5") to uniquely represent a particular document. Further, a single MD5 might uniquely represent many documents (for example, using a descriptor file), and an individual document might contain many different MD5s each referencing a single document or a set of documents.

There are two risks associated with hash functions that receive attention: the statistical hash function collision and the hash attack. A hash collision occurs when, by pure coincidence and in absence of any malice, a system implementing content-addressable storage will contain two files with different content yet having the same hash value, i.e., the same "content address." Under almost any conceivable scenario, this risk will remain negligible for a very long time—even though there would be substantial value in eliminating or strongly reducing it for marketing purposes.

A hash attack is an entirely different proposition, and is also known as a "second pre-image finding." A hash attack is when an unscrupulous party maliciously generates a significantly modified version of a computer file (for example) that has been arranged to produce a hash value (or "content address") identical to the hash value of the original file. A hash attack may simply insert a random bit pattern into a file or the meaning of a contract document might be changed. In any case, the hash attack amounts to the "breaking" of the hash function and the destruction of digital information thought properly preserved.

In any scenario the credibility of the system itself is at stake: after a few successful and widely published hash attacks (even under academic conditions without immediate real-world applicability), the system becomes suspect in the mind of the public. Further, the system would also be suspect once it is simply proven that the hash function in use could be broken. As computing resources continue to evolve, such a hash attack might succeed over the longer term. As larger hash function sizes are chosen and broken in succession, compatibility problems and broken trust chains result. This result is not an attractive prospect for the long-term storage services that should be a natural application for such a system.

Simply using a hash function having an enormous size is not always practical. On one hand, the hash function should be large enough to guarantee that hash function collisions (identical hash values for two different inputs) are statistically excluded. On the other hand, it should be small enough to remain practical as a reference in its targeted applications, as well as affordable in terms of processor time required for computing the hash value.

Unfortunately—even if a system is generally operational for a particular size hash function—changing to a different hash size is a major operation with many implications, loss of efficiency, and application conversion costs as well as backward compatibility overhead. For example, replacing the MD5 algorithm in a content-addressable storage system with a different hash function and generating new message digests for every computer file presents problems. Because the 128-bit message digests (each representing a unique address for a file) are likely sprinkled throughout other documents and computer systems worldwide, it can prove nearly impossible to replace these 128-bit message digests with the newly calculated message digests. Additionally, if the conversion occurs after the time the earlier hash function is generally accepted to be "broken," an important and essentially irrecoverable "trust gap" may be a consequence, as the existing content addresses will not be beyond suspicion at conversion time.

Thus mechanisms and techniques are needed to remedy the above issues.

SUMMARY OF THE INVENTION

To achieve the foregoing, and in accordance with the purpose of the present invention, a technique is described that helps to eliminate malicious hash attacks and provides assurances that hash function collisions will be detected.

The general idea is to decouple content addressing from content verification. In other words, the hash function used for content addressing is different from the hash function used for content verification. In a variation, a random number generator is used instead of a hash function for content addressing. The technique allows that over time the content verification hash function can be changed and strengthened in a transparent fashion, and remain fully backwards-compatible with regard to any application using the content addresses computed using the content addressing hash function. Thus, hash attacks can be detected and deflected relying upon the full strength of the verification hash function, rather than that of the content addressing hash function. As a consequence, fewer malicious attacks worth speaking of are to be expected, since they will be known to have little chance of succeeding.

This approach offers significant advantages over the default scenario of simply upgrading the single content addressing hash function over the whole system, which would require major conversions in most applications and would endanger the integrity of existing content-addressed data collections, thus strongly reducing the technology's appeal for long-term archival functions.

Use of a second hash function for verification allows detection of a collision involving, or hash attack on, the addressing hash function. Although it is statistically improbable that a collision would occur between two files using a 128-bit addressing hash function; still, the public may need some comfort that any such collision can be detected. Even if a collision were to occur, the verification hash value for the two files would be different, thus flagging the problem that the addressing hash function has yielded the same value for two different files. Similarly, should an unscrupulous party attack the 128-bit hash function and devise a way such that two files gave the same hash value, this attack would also be detected by virtue of the difference in the verification hash values. Thus, because it is nearly a certainty that any such attack would be detected, it is far less likely that someone would spend the time and resources to carry out such an attack.

BRIEF DESCRIPTION OF THE DRAWINGS

The invention, together with further advantages thereof, may best be understood by reference to the following description taken in conjunction with the accompanying drawings in which:

FIG. 11 illustrates one embodiment of a hash authority table having the additional security measures.

FIG. 12 illustrates a table containing verification hash values for any number of files as well as corresponding random numbers for the files.

FIG. 15 illustrates one embodiment of an identifier authority table in which additional security techniques are also applicable.

DETAILED DESCRIPTION OF THE INVENTION

Given the nature of the prior art, and the potential problems (whether real or perceived in the mind of the public) with continuing to use an older, potentially less secure hash function (for example, a 128-bit hash function), an improvement is desired. It is realized that a hash function of the prior art serves two purposes. A hash value produced by a hash function not only provides a near unique content-based address for any given computer file, but also provides a unique value that can be used to verify the content of the file. A hash function produces a single hash value that is used for both addressing and for verification of content. It is then realized that the size of the address space made available by a 128-bit hash function is not realistically a problem. A 128-bit hash function (for example), provides an address space of $2^{128}$ addresses; a quantity of unique addresses that for all intents and purposes, will not run out in the foreseeable future, nor would result in a collision.

But the same hash function is also used to provide verification of the contents of a file: when a file is retrieved using its hash value as an address, the hash value can be recalculated and compared to the original. Since it is desired to strengthen the hash function used, it is thus realized that a second verification hash function may be used to provide verification of the contents of a file, while retaining the original addressing hash function to provide a unique address. Retaining the original addressing hash function has many advantages, including the benefit that the unique value used to address a file can continue to be used. Because this unique value may have been distributed to many locations or inserted into other documents in order to reference the file in question, it is important that this unique address not change. And by allowing a second, likely stronger, verification hash function to be used to verify the contents of the file, one is provided greater assurance that such a system will not be subject to a hash attack. Such a system allows the verification hash function to be dynamically upgraded over time, without losing the benefits of a stable, unique content address for a given file.

Content-Addressable Storage

Figure 1:
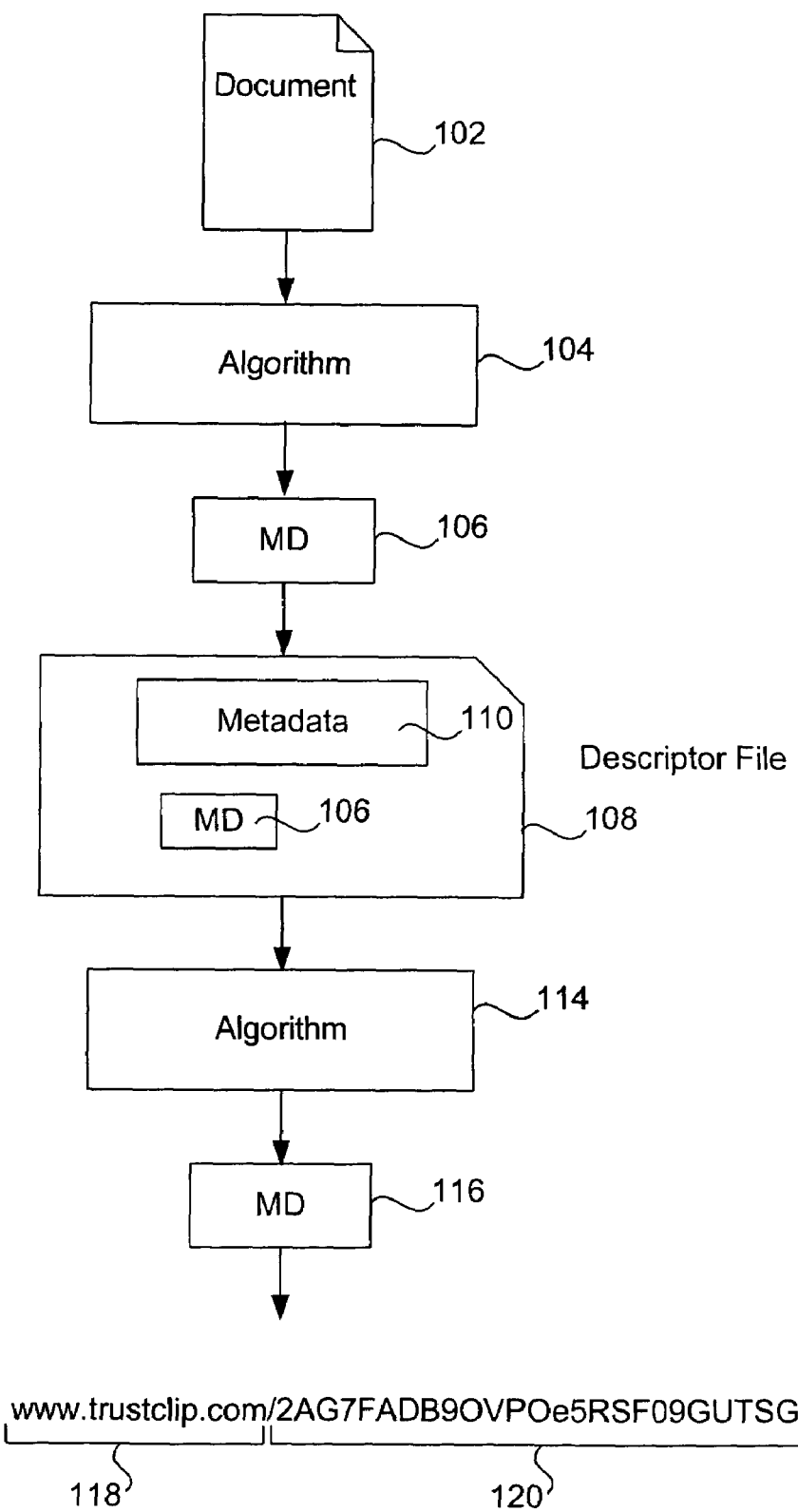
FIG. 1 illustrates a technique of creating a hash-based unique identifier for a document.

To help understand the following discussion, it will be useful to briefly review content-addressable storage. FIG. 1 illustrates a technique of creating a hash-based unique identifier 122 for document 102. The following description uses the example of simple documents being represented and managed; however, document 102 may be any type of information represented in digital form. For example, the present invention is applicable to any electronic representation of information such as a computer file, a group of files, a group of file identifiers, or other collections of data or database information. Such other collections of data include frames or clips from digital audio or video streams, digital photographs, scanned paper documents, voice messages, CAD/CAM designs, MRI or X-ray data, streams from message records or files, log entries from audits or status logs of systems, e-mail archives, check images, etc. Database information includes records from a relational, hierarchic, network or other database. In general, digital information may include any string of binary (or n-nary) digits. In one embodiment, the digital information is manipulated as binary large objects, or BLOBs. The following description uses computer files as examples, although the invention is not so limited. The term "computer file" is used herein to encompass any electronic representation of the aforementioned types of information.

An algorithm 104 is used to process document 102 to produce a unique identifier 106 for the document. Preferably, algorithm 104 is a hash function that produces a hash value 106. In this example, a hash function is used to produce the hash value or message digest ("MD") 106. Well known hash functions include: MD2, MD5, SHA-1, SHA-256, RIPEMD-160, etc.

As is known in the art, use of a hash function over a document produces a unique hash value or message digest that is a "digital fingerprint" of the document and uniquely identifies it. The term message digest or "MD" is often used to refer to the hash value created by a hash function and is intended to encompass any type of hash function that might be used to create a unique, content-based identifier for a document. This example assumes that the MD5 algorithm is used to create MD 106.

Message digest 106 can be used as is for purposes of the present invention or it may be embedded within a descriptor file 108. Descriptor file 108 includes message digest 106 and any of a variety of meta data 110 that further describes, identifies or explains the information of document 102, or any other information. A description of descriptor files and types of meta data are described in the international applications referenced above. In one embodiment, meta data 110 includes a descriptive file name, the file size, access rights, the owner, a retention period, etc. Higher-level information such as a subject, a title, an author, a date, may also be included. Descriptor files are useful for serving as a placeholder for this type of information if needed for a particular application, and also for holding the message digests for a group of files, if the situation so dictates. Message digests might reference a descriptor file or might directly identify an individual document.

Once the descriptor file has been formed, a hash function 114 is applied to the descriptor file to produce another message digest 116. Message digest 116 may now be used to uniquely locate and identify document 102 using techniques shown in the prior art. For example, descriptor file 108 and document 102 may be stored in the regular file system of a computer where their file names respectively are the bit string represented by MD 116 and MD 106. Or, each file may be stored within a database where the key to the file is the respective message digest for each file. In general, file 108 and document 102 may be stored within any content-addressable storage system where they can be located and retrieved using their message digests alone.

MD5 message digests (or other hash values) may be converted to a form easily readable and noted by a human. Because a resultant message digest from the MD5 hash function is a 128-bit number, it is desirable to encode this number in a more manageable form for human use. The resultant number may be encoded in any of a variety of forms including decimal, hexadecimal or binary. Preferably, the number is converted to a base 32 number mapped to the set of twenty-six alphabetic and numeric characters in the base ASCII character set. This mapping is referred to as "ASCII Armoring" and is commonly used to render binary information in a limited character set for transmission over protocols that require content to be constrained to alphanumeric coding. A flag character is included at a predetermined position within the resulting string, bringing the total length of the string to 27 characters. This flag character can also provide information such as algorithm to use, type of file, etc.

The result is a 27-character ASCII string of digits and upper case letters. Such a format provides a compact form that may more easily be written down by a person and/or manipulated by a computer, and is also in a form that is easily accommodated by many software programs. In addition, this particular representation of a message digest has the advantage of being more easily retrieved by data query, coded into software application file requests, referenced by a content or asset management system, requested in an object browser, electronically copied and pasted from one document to another, sent via electronic mail, etc.

In this example, MD 116 has been converted into the 27-character string 120. In a particular embodiment, string 120 is concatenated with an Internet name 118 to produce a URL 122. Name 118 is resolvable by a DNS and includes a domain name "trustclip.com." In this particular embodiment, "trustclip.com" is used to locate a web server that is connected to a content-addressable storage device. A service provider operating the domain "trustclip.com" stores such documents using the message digest as a unique identifier and makes such a document available to a user when a URL (such as URL 122) is provided. In this fashion, when a user is given URL 122, or otherwise uses it as a link, the web site "trustclip.com" takes MD 120, locates the document, and returns it to the user. If MD 120 identifies a descriptor file that includes message digests for multiple documents, then all of these documents are returned. A message digest (in form 116, 120 or other) may be used in many ways to locate an original document. As previously mentioned, the message digest may be used as the file name of the document, a key in a database, embedded within a URL or URI (or other file locator such as an IP address or path name), or may simply be used as is.

In another embodiment, the message digest is given to a service provider who then uses the message digest to search for and locate the document that is uniquely identified by the message digest. For example, the service provider may search their own content-addressable storage, or may search for the document in the storage of other entities. The message digest may also be broadcast throughout a corporate network, over an intranet, over the Internet, or in other ways with the purpose of finding the document that is uniquely identified by the message digest. Embodiments of descriptor files are described in the above-referenced international applications.

Verification Hash Function Usage

Figure 2:
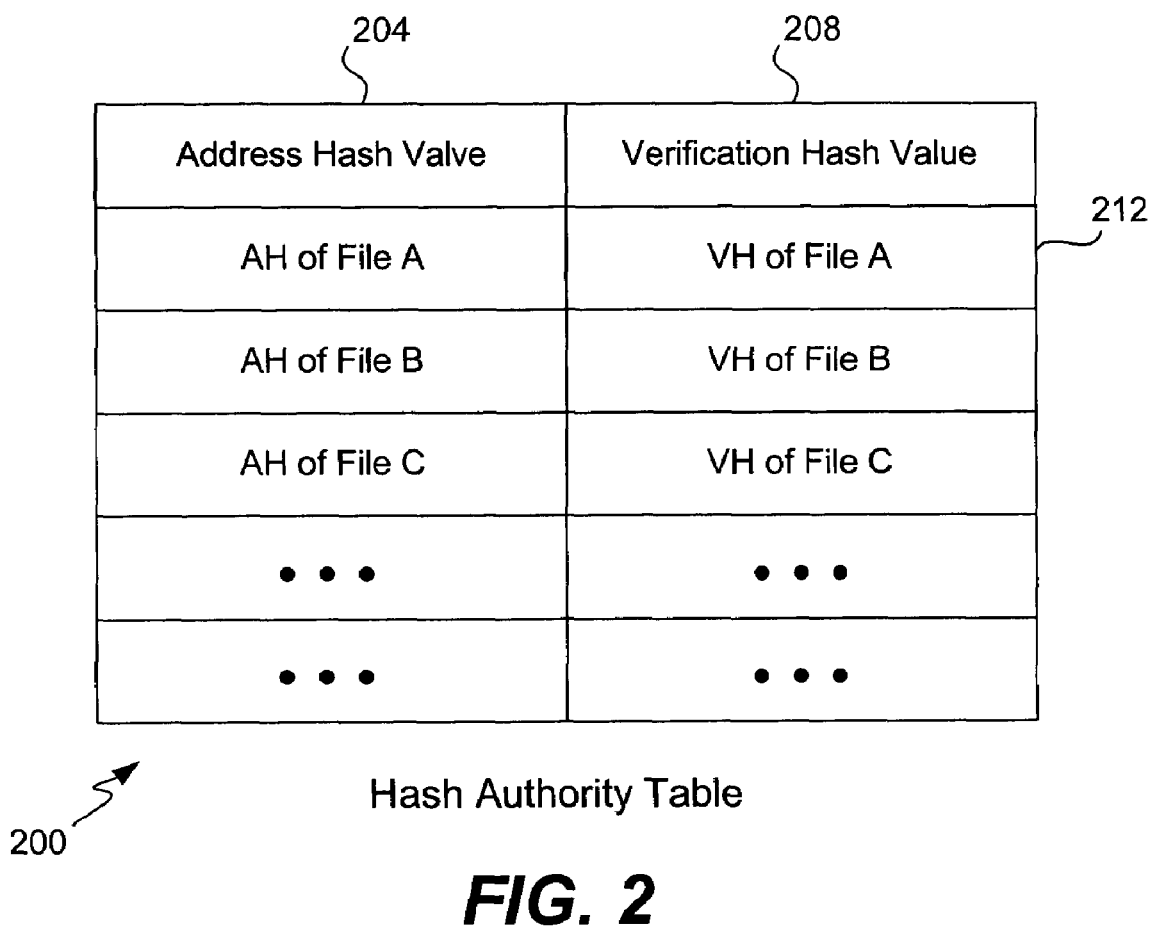
FIG. 2 illustrates a table containing hash values for any number of files computed using different hash functions.

FIG. 2 illustrates a Table 200 containing hash values for any number of files computed using different hash functions. Table 200 is termed a "hash authority" table in one embodiment. For a particular file contained in a database, Table 200 may hold any number of different hash values for that file computed using different hash functions. For example, Table 200 includes column 204 holding address hash values (AHs) computed using a first hash function (for example, the MD5 algorithm), and column 208 holding verification hash values (VHs) computed using a different hash function. Each row corresponds to a given file. For example, row 212 corresponds to file A, and contains the AH for file A computed using the MD5 algorithm (for example). The VH for file A is computed using a 256-bit hash function or a stronger one. Row 212 shows that for a particular file A, its AH is stored associated with its VH, thus by reference to an AH for a particular file its VH may be obtained, and vice versa. The VH for a particular file may be the result of a hash function having the same strength (or lesser strength) as the hash function used to calculate the AH for the file; however, it is preferable that the hash function used to compute the VH be stronger. Also, there may be numerous columns such as column 208, such that for a given file, it has numerous VH values computed using different verification hash functions.

Table 200 may have any number entries (or records) depending upon the number of files being stored. Table 200 may be associated with files stored on a single computer, on a network of computers, over a distributed network of computers, or in any database suitable for storing files or other digital information. Further, Table 200 may have its entries protected using hash functions, time stamps and or digital signatures as will be appreciated by those skilled in the art. Further, the AH and VH for a particular file may be associated with each other using any other suitable data structure, and not necessarily a table.

Figure 3:
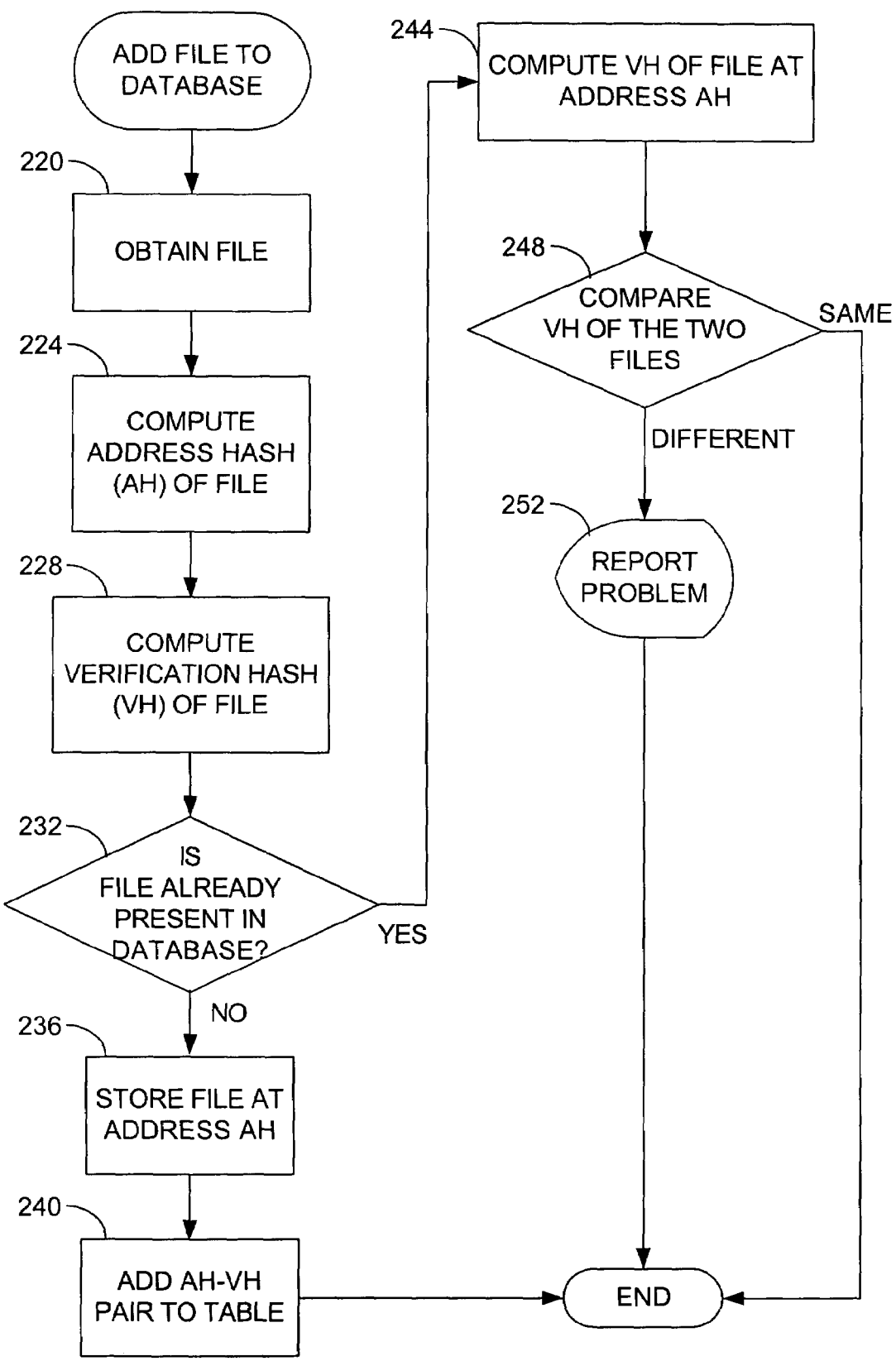
FIG. 3 is a flow diagram describing one embodiment for adding a file to a database.

FIG. 3 is a flow diagram describing one embodiment for adding a file to a database. In this simple example, it is desired to add a computer file or other type of digital information to a database of files using techniques of the present invention. This database preferably stores files using a content-based addressing scheme in which a hash value of the file is used as its unique address. Two different hash functions are associated with the database. An addressing hash function that generates address hash values (AH) used to address each file, and a verification hash function used to generate verification hash values (VH) used to verify the content of a particular file. Preferably the verification hash function is stronger than the addressing hash function; examples of stronger hash functions are SHA-256 and RIPEMD-256.

In one embodiment, the verification hash function is the same hash function as the addressing hash function, but it uses a flag, parameter, extra input, variation or other modification so that it produces a hash value different than that produced by the addressing hash function. For example, the file may be modified slightly by including metadata such as file name, size, owner, creation date or repeats such as the last 4k block of the file.

A data structure such as Table 200 exists and includes entries for all files present in the database and their corresponding hash values, although such a table may be empty to begin with if no files have been added yet.

In 220 the file to be added is obtained from any suitable source. In 224, the addressing hash function is applied to the file in order to generate the AH of the file to determine its unique address. In 228 the verification hash function is used to generate the VH of the file. Step 232 checks whether the file to be added is already present in the database. Checking for such file may be performed in different ways. In one embodiment, the entire database is searched for the file using its AH as an identifier or index. For example, files may be stored under a file name that is the AH of the file; the entire file system can then be scanned to see if the AH is present. In another embodiment, the AH may be used as a look-up into Table 200 to determine if the file is already present.

If it is determined that the file is not present in the database (by virtue of not finding any matches to the AH of the file), then at 236 the file is stored within the database using as its address its AH. For example, the file may be given a file name which is its AH. Next at 240, the AH-VH pair for this particular file is added to Table 200 such that an entry for the newly added file now exists in Table 200. The AH is returned to the requester as the unique address for the file in the database. The process then ends.

Returning to step 232, if it is determined that the file is already present in the database (by virtue of a match being found for the AH of the file), then it is determined whether the file that is already present in the database is in fact the same file that is desired to be added. In 244 the VH is computed for the file that resides at address AH within the database. In 248 the VH for the file residing in the database is compared to the VH for the file to be added (from step 228). In most all cases, the two VHs will be the same indicating that the file to be added does already exist within the database. If this is the case, the AH is returned to the requester as the unique address for the file in the database and the process ends. On the other hand, if the VHs for the two files are different, this indicates a problem.

In 252 the system reports the existence of a problem. This problem could be the result of a hash attack in which one of the two files has been maliciously altered such that although the addressing hash function indicates the files are the same, the verification hash function (which is stronger and more reliable) indicates that the two files in fact are different. Another possibility is that there has been a technical malfunction within the system hardware or software, and although the VH values appear different, the files in fact are the same. A third possibility is that a hash collision has occurred and that even though the two files are in fact different, calculation of an address hash value for each file yields that same value. In any case, step 252 indicates the problem to the system or user who may then take appropriate action. In any case, it is preferable that the file not be added to the database at this time, although such a scenario is possible depending upon the particular implementation.

Figure 4:
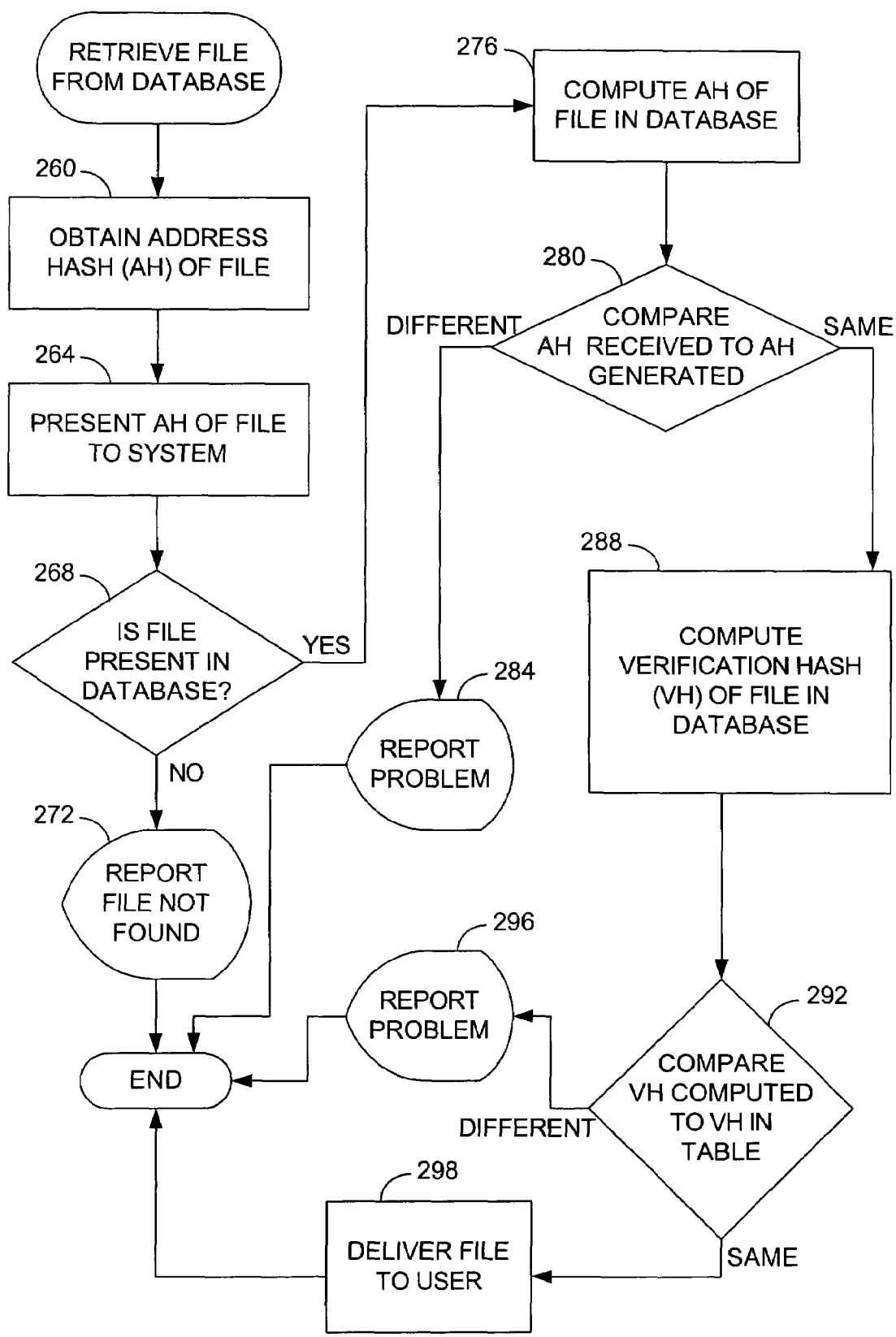
FIG. 4 is a flow diagram describing one embodiment by which a file is retrieved from a database.

FIG. 4 is a flow diagram describing one embodiment by which a file is retrieved from a database. In this situation, a user wishes to retrieve a file from the database implemented using techniques of the present invention. In 260 a user or software application desires a particular file and will ask for that file based on a previously calculated hash value for that file. Preferably, the user or application knows that the hash value for the file has been computed using a particular addressing hash function that is also used by the system to calculate AH values. The AH for the desired file is obtained by the user or application from any suitable source that has stored the AH. In 264 the user or application presents this address hash value (AH) of the desired file to the system. In 268 the system uses the AH to determine if the desired file is present in the database using, for example, techniques explained earlier in step 232. The hash authority table may be consulted in this step to retrieve the AH and VH for the file, if present. If it is determined that the file is not present in the database, then in 272 the system reports to the user or application that the desired file has not been found.

If, however, the system indicates that it believes the file has been found, then in 276 the system computes the AH of the file found in the database. In 280 the AH received from the user in 264 is compared to the AH generated in 276. This comparison is performed as a check to insure that the file stored at address AH does in fact have an address hash value equivalent to AH. In some circumstances, it is possibly not to perform this comparison step.

If the AH values are different then in 284 an abnormality is reported to the user or application. Different AH values computed in 280 will typically indicate that the local file has been corrupted and should not be returned to the user. If the AH values are the same, this indicates that the file found at address AH is likely the file desired by the user. Accordingly, in 288 the verification hash value (VH) of the file found in the database is computed. In 292 this computed VH is compared to the VH for this file from the entry in the hash authority table. The entry in the hash authority table corresponding to this file is looked up during step 268 using the AH as an index or the VH may be looked up in the table at this point in time also using the AH of the file as an index. If the VH values are different, then in 296 a problem is reported to the user indicating the same possible problems as described in step 252. If the VH values are the same, this indicates that the file found at address AH is the same file that was originally stored at this location when the file was first added to the database. Equivalent VH values in this step reliably indicate that the file found is the file desired by the user. In 298 the file is delivered to the user or software application requesting it.

Figure 5:
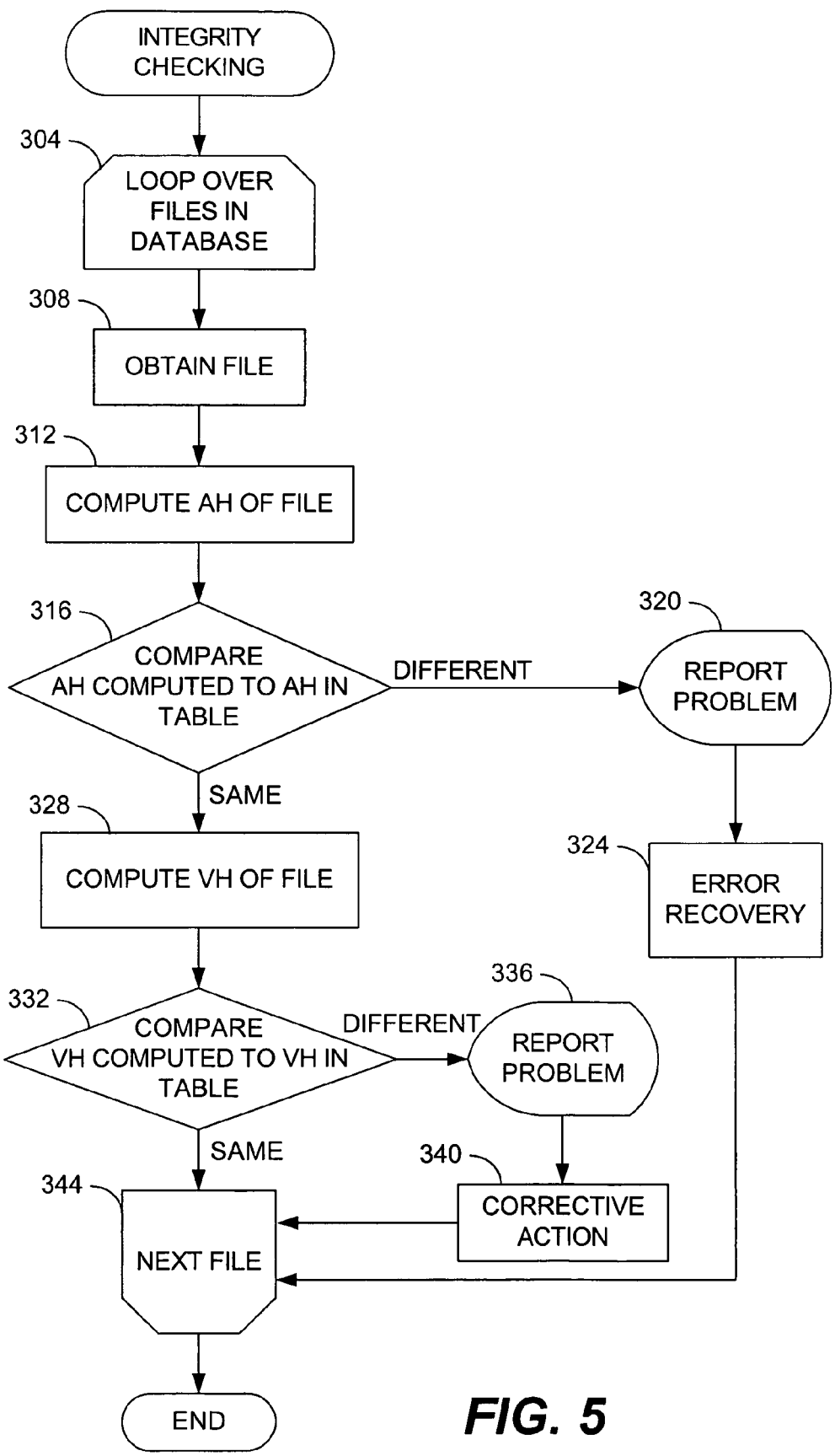
FIG. 5 is a flow diagram describing a technique for checking the integrity of files in a database implemented using embodiments of the present invention.

FIG. 5 is a flow diagram describing a technique for checking the integrity of files in a database implemented using embodiments of the present invention. In this situation, it is desired to continuously check the integrity of files stored in a database in order to sound an alert if an anomaly is found and to take corrective action if needed. Without such continuous integrity checking, it is possible that an unscrupulous party might replace, modify or delete an original file of the database and the original data would be lost. For example, should someone find a way to break the lower strength hash function used to compute the address hash value (AH) for a file, it might be possible for that person to insert a bogus file into the database. In other words, the bogus file would be a modified version of the original file, yet its address hash value would be the same as the original file. Thus, a file might be modified for an illicit purpose and inserted into the database to masquerade as the true file. Because the address hash values for both files would be the same, it could prove extremely difficult to prove that the illicitly modified file is not the correct file. Even if a verification hash function is used to verify the contents of such a file, thus proving that the modified file is an illicit version, the original contents of the true file would be lost.

In this embodiment of the invention, the database holding the computer files keeps a duplicate of each file (or even more copies), thus when an error is detected in one copy, the suspect file can be replaced with its duplicate. While prior art techniques might involve the use of such duplication and file replacement, the following description provides a way to perform continuous integrity checking using a second verification hash function. In this scenario, a number of computer files have been stored in a suitable database according to embodiments of the present invention. For each file stored in the database, and address hash value (AH) and a verification hash value (VH) pair has been stored in a table or other suitable data structure. The flow diagram of FIG. 5 provides a way to continuously check the integrity of these files using the added strength and advantages of a second verification hash function.

Beginning at 304, the system iterates over all files (or a subset of all files if desired) in the database. This iteration may be performed by sequentially stepping through all files present in the database using their file names or other identifiers, or a table such as hash authority table 200 may be used to iterate over all files in the database by referencing each file using its AH from the table. Other techniques for iteration over various files include randomly selecting files or file entries in the table.

In 308 the file to be checked is obtained by referencing the existing AH of the file (obtained from a table, from the file name, or via other means) to determine the address of the file in the database. In 312 the addressing hash function in use by the system is applied to the file to compute the AH of the file. In 316 this computed AH is compared to the existing AH for the file found in the hash authority table.

If the AH values are different, then in 320 the system reports a problem to the user or to the application performing the integrity checking. If the AH values are different, the system assumes that the current file being analyzed has been corrupted in some fashion (via a technical malfunction, an attack or other) and the system performs error recovery in 324. As the system as previously stored a copy of the current file in another location, the AH from the hash authority table (used to first locate the file) is used to locate an existing good copy of that file. Once located, the suspect file is replaced with the known good copy. As it is statistically improbable that both copies of the file have become corrupted at the same time, it is assumed that the duplicate of the file is a good copy. Of course, the AH of the duplicate may also be computed to be compared against the AH found in the hash authority table in order to double check the integrity of the duplicate. Other error recovery procedures may be performed. For example, depending upon an implementation approach, the system may decide not to replace the suspect file, the suspect file may be deleted, or the suspect file may be added to the storage as a version of the original to document and keep evidence of the tampering attempt. Once error recovery has been performed for the current file in question, the loop continues at 344 and the next file to have its integrity checked is obtained.

Returning to step 316, if the AH values are the same, this indicates that the current file found at content address AH is likely the file originally stored at that address. In 328 the verification hash value (VH) of the file is computed in order to further check the integrity of the file. Preferably, the verification hash function used by the system is different and stronger than the addressing hash function. In 332 the VH computed for the file is compared to the existing VH present in the hash authority table (computed when the file was originally stored). If the VH values are different, then in 336 a problem is reported generally as described at step 252.

In 340 the system may take suitable corrective action to remedy the problem. For example, the file can be flagged as being suspect, an audit may be performed to determine why the VH values were different, the duplicate of the current file may be used to replace the suspect file copy, the other existing copies of the file may be deleted, etc. The corrective action taken depends upon the design and implementation of the system and the goals that the operator of the system wishes to achieve. Once suitable action has been taken, in 344 the next file to be analyzed is obtained.

Returning now to step 332, if the VH values are the same, this indicates with near certainty the file currently present at content address AH is in fact the file that was originally placed there when its AH-VH pair was added to the hash authority table. In this situation, no reporting or corrective action is needed and in 344 the next file to be analyzed is obtained. Once all files have been checked via loop 304-344, the process ends or loops.

Multi-Level Embodiment

Figure 6:
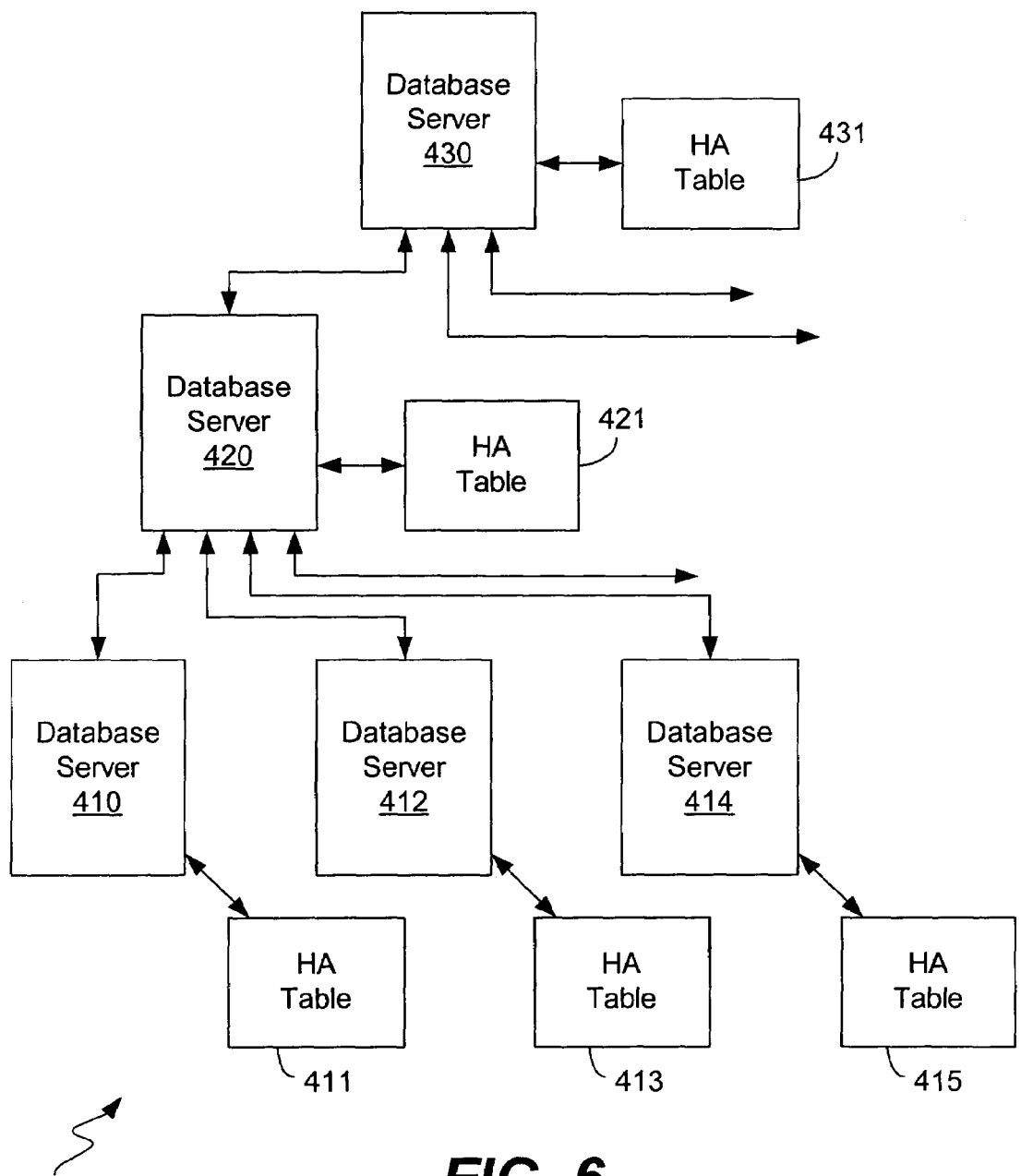
FIG. 6 illustrates a multi-level database in which the database holding the computer files is distributed amongst numerous server computers.

Embodiments of the present invention may be implemented in a database residing on a desktop computer, a server, a dedicated main frame, etc., as well as in a distributed fashion. FIG. 6 illustrates a multi-level database 400 in which the database holding the computer files (or other digital information) is distributed amongst numerous server computers. The database may be implemented in a distributed fashion over any number of computers, including the simple multi-level database shown in FIG. 6. Of course, there may be fewer or greater number of levels, as well as fewer or greater number of database servers arranged in a different type of hierarchy. In this example, database servers 410, 412, and 414 represent servers associated with departments of a large corporation. Database server 420 (and others not shown) represent the division level within the corporation having the three departments as shown (and others not shown). Database server 430 is associated with a head corporate office and may also be linked to other servers corresponding to other corporations or subsidiaries, and may even have a link to a next higher level where a global hash authority may reside.

Associated with each database server is a hash authority table (Table 411, for example), implemented perhaps as shown in FIG. 2 or using a similarly functioning data structure. Each table at a particular level represents not only the files (and their associated hash values) stored at the server at that level, but also all files at the next lower level. In this fashion, a hash authority table at a given level is aware of all content at the lower levels, as well as the content stored at that server. This multi-level database embodiment addresses a need to use distributed computers for efficiency, scalability and local processing, while at the same time allows a hash authority table at a given level to not only keep track of the content below it but to verify the integrity of that content. For example, if the same file is added to different database servers within the database, there will be multiple copies of this file on different servers and identical entries in different hash authority tables. Should an unscrupulous party be successful in modifying one copy of the file within the database, this illicit copy could cast into doubt the integrity of the true copies. The following description addresses these issues.

Figure 7:
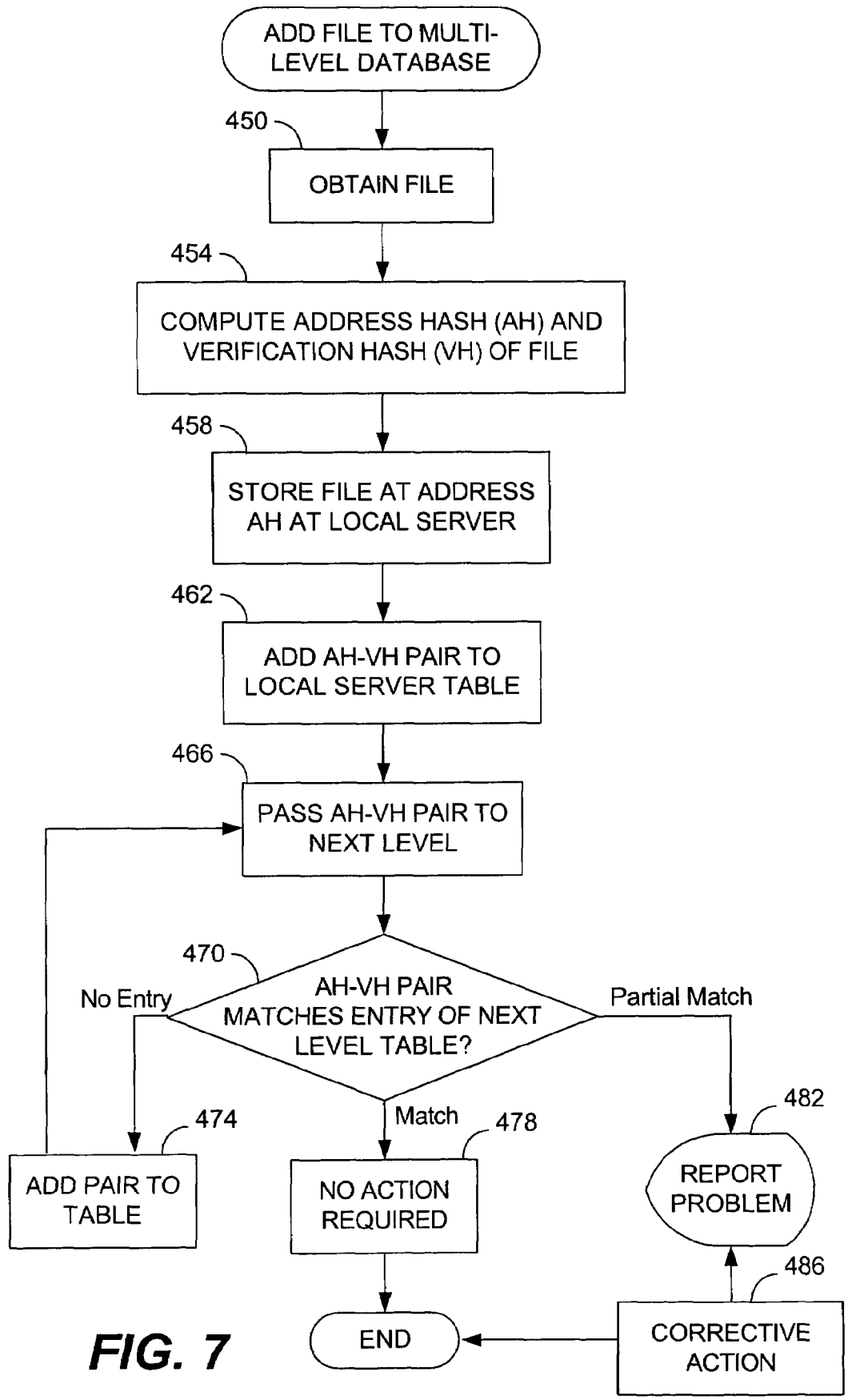
FIG. 7 is a flow diagram describing one technique for adding a file to a multi-level database.

FIG. 7 is a flow diagram describing one technique for adding a file to a multi-level database. In 450 a computer file (or other digital information) is obtained and an indication is received from a user (or other software application) that this file should be added to the database. In 454 the address hash value (AH) and the verification hash value (VH) of the file are computed. In 458 the file is stored at an address AH on local server 410 (for example) and the computed AH-VH pair is added to local Table 411 (for example). In 466 the computed AH-VH pair is passed up to the next level, namely database server 420, with the intention of adding the pair to Table 421 if it does not already exist. For ease of explanation, we assume that the file was not already present on server 410, although the embodiment of FIG. 3 may be used to check if the file has been previously stored.

When a file is being added to a database (for example, as in FIG. 3 or in FIG. 7) the system may first check whether that file already exists in the database or it may choose not to check. Whether or not the system checks is an implementation detail that depends upon the type of information contained in the computer file, among other factors. For example, if the computer file contains MRI data or X-ray data, it is a near certainty that the contents of one file will be unlike the contents of any other file. Thus, for efficiency reasons, it would not be necessary to check to see if the file already exists in the database before adding it, because of the unlikelihood that the same exact file is already present. On the other hand, should a file represent a popular e-mail attachment that many employees are attempting to store into the corporate database, it would be beneficial to check first to see if such a file has already been added to the database. Whether or not the system checks first may depend upon other factors as well.

In 470 the AH-VH pair received from server 410 is compared against the existing entries in Table 421 at the next higher level. Depending upon whether a similar entry exists or not, there are three possible outcomes to this comparison. If there is no AH value in Table 421 corresponding to the AH value that has been passed up from Table 411, then it is determined that there is no entry in Table 421 corresponding to the file added to server 410 and that the file has not been added to server 420 as well as to any of its other lower level servers (412 and 414 in this example). If this is the situation, then in 474 the AH-VH pair passed up from Table 411 is added as an entry into Table 421. The file stored on server 410 may also be copied to server 420, although this is not strictly necessary. Now Table 421 also includes the AH-VH pair indicating that at least one of the lower level servers includes the corresponding computer file. After the pair has been added to the table, then flow loops back up to step 466 in which the same AH-VH pair is passed up to the next higher level (server 430 and Table 431) to check and see whether a match exists at the next higher level. This passing and checking continues until all levels are exhausted.

Returning now to step 470, if it is determined that the AH-VH pair passed from Table 411 matches exactly (that is the AH values and the VH values match), then this indicates that the computer file just added to server 410 also exists in server 420 or perhaps in one of its lower level servers. In 478 no action is required unless an implementation of the system requires that one of the copies of the file be deleted. (This could be the foundation of a mechanism to assert that any given file be stored only once in a distributed environment, to save storage capacity). In both 474 and 478 the AH is returned to the requester as the unique address for the file. After 478 the process ends.

If, however, the AH values match but the VH values do not match, this indicates a problem which is reported in 482. As discussed before, this problem could be a collision, a technical malfunction or a hash attack. Corrective action may be taken in 486 such as those actions described at step 340. After any suitable action is taken, the process ends. In other embodiments, the system may decide to transfer control to step 466 after step 486 in which the AH-VH pair is passed up to the next higher level as previously described.

Other previously described embodiments may also be implemented using the multi-level database of FIG. 6, or a similar distributed database. For example, the retrieve embodiment described in FIG. 4 may also be implemented over a distributed database, in which case step 268 would search over the various database servers rather than a single server. Likewise, the integrity checking embodiment described in FIG. 5 may also be implemented over a distributed database in which the loop of step 304 would take into account all files resident on the various database servers.

Figure 8:
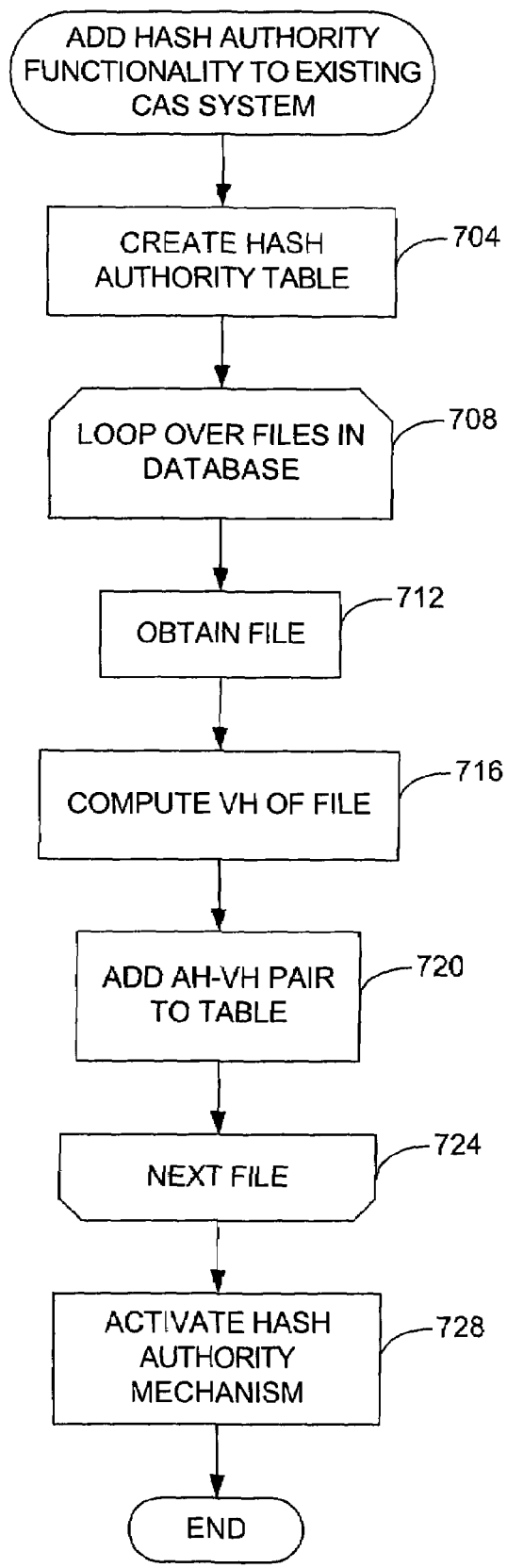
FIG. 8 is a flow diagram describing one technique for adding hash authority functionality to an existing content-addressable storage system.

Adding Hash Authority Functionality to an Existing Content-Addressable Storage System FIG. 8 is a flow diagram describing one technique for adding hash authority functionality to an existing content-addressable storage system. The prior art describes a content-addressable storage technique by which a hash function is used to generate a unique message digest for a given file. When the file is stored in a content-addressable storage (CAS) system its message digest may be used to not only uniquely address the file but also to verify the contents of the file. Using the below embodiment, it is possible to add the hash authority functionality as herein described to such a CAS system (i.e., add the usage of a second verification hash function). In 704 a hash authority table similar to that of FIG. 2 or a similar data structure is created to hold address hash values (AH) and verification hash values (VH). The existing CAS system already makes use of a particular hash function (hereinafter referred to as the addressing hash function) to generate a content address or address hash value (AH) for each file. These AH values will be placed into the first column of the newly created hash authority table while the second column will hold the verification hash values generated by a verification hash function over each file. Preferably, the verification hash function is a different hash function that is stronger than the addressing hash function.

In 708 a loop begins that iterates over each file or content address in the database. In 712 the next file is obtained along with its address hash value (AH) or content address. In 716 the verification hash function is used to compute the VH for the file. Then in 720, this AH-VH pair is added as an entry into the hash authority table. In 724 the loop continues to the next file in the database. Once all files in the database have been processed and their AH-VH pairs entered into the table, at 728 the new hash authority mechanism is activated. This activation means that any future add, retrieve or integrity check process will make use of the hash authority table as previously described.

Upgrading a Verification Hash Function

Figure 9:
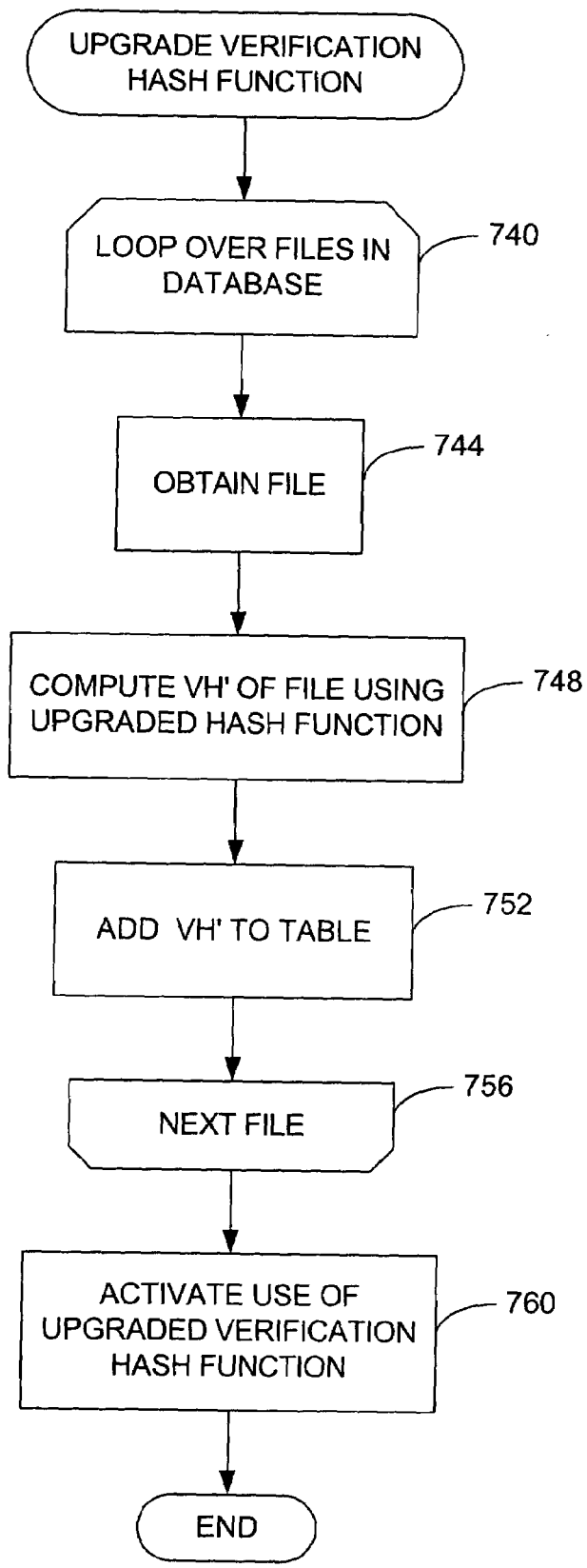
FIG. 9 is a flow diagram describing a technique for upgrading a verification hash function.

FIG. 9 is a flow diagram describing a technique for upgrading a verification hash function. As previously described, a verification hash function is used in addition to an addressing hash function to verify the contents of a file. It is also possible to replace an existing verification hash function or to add a second verification hash function to the system to provide greater integrity. For example, should a 256-bit verification hash function currently be in use, a 512-bit verification hash function may be added and used as well. The following describes a technique in which a second verification hash function is used along with the first, although it is also possible to replace the first verification hash function with the second.

Step 740 begins a loop which iterates over all files in the database. The loop may reference each file in order via their file names or computed hash values, or may use the hash authority table to iterate over each file. In 744, the next file to be processed is obtained from the database.

In 748 the new verification hash function is used to compute VH', a new verification hash value for the file. In 752 VH' is added to the hash authority table, for example by adding a third column to the table that holds all of the verification hash values computed using the new verification hash function. For example, as shown in FIG. 11. Thus, a given entry for a file in the table will have three hash values: a first value for the address hash, a second value for the first verification hash, and a third value for the second verification hash. Of course, in an alternative embodiment, the second verification hash value simply replaces the first verification hash value and the table remains at two columns. In 756 the next file is processed.

Once all files have been processed, in 760 the system activates use of the new upgraded verification hash function by flagging its presence in the system. Presence of the upgraded hash function has ramifications for add, retrieve and integrity checking processes. For example, when a file is added both verification hash functions will be used to compute two different verification hash values that will be added to the table. Similarly, when a file is retrieved both verification hash functions will be used to verify the contents of the file. The integrity checking process would also use both verification hash functions.

Figure 10:
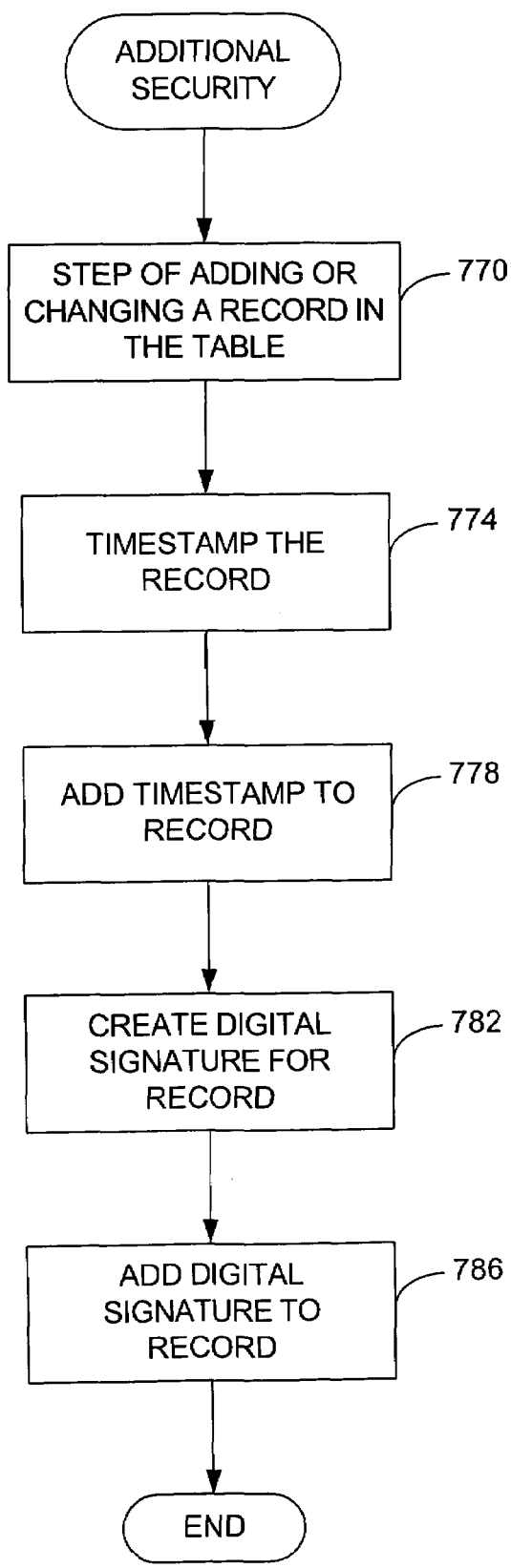
FIG. 10 is a flow diagram describing additional techniques that may be use to provide security for a hash authority table.

FIG. 10 is a flow diagram describing additional techniques that may be use to provide security for a hash authority table. FIG. 11 illustrates one embodiment of a hash authority table 800 having the additional security measures. Table 800 includes column 802 for address hash values, column 804 for a first verification hash function values, column 806 for a second verification hash function values, column 808 for time stamps, and column 810 for digital signatures. This table implements the embodiment in which a second verification hash function is used, although the additional security techniques may be used with any embodiment of a hash authority table.

The addition security techniques are preferably used as in step 770 when, during any process, a record in the hash authority table is added or changed. For example, a record is added when a new file is added to the database, and a record is changed when a new verification hash function value is added or a mapping is added as shown in FIG. 15 and described below. Any addition to, or modification of, an entry in the table may call for use of these security techniques. In these situations, it may be appropriate to take the following additional steps.

In 774 the existing entries in the record (e.g., columns 802-806) are time stamped using any suitable time stamp method. In 778 the time stamp is added to the record in column 808. In 782, to authenticate the hash authority, a digital signature is created for the record using any suitable digital signature. The digital signature may include any appropriate information in the record including the AH and VH values, the time stamp and the digital signature of the previous record. In 786 the digital signature is added to the record in column 810.

Use of a Random Number as a Unique Identifier

Once it has been realized that the different functions of addressing and verification can be handled by two separate hash functions (as previously described), it is further realized that a unique number other than one generated by an addressing hash function may also be used to uniquely identify a file and serve as its unique address within a database. In other words, because an addressing hash function is not being used for verification purposes (because of the use of a separate verification hash function), it would not seem strictly necessary to use an addressing hash function to generate a unique number by which to generate a unique address for a file. To those ends, it is realized that if a large enough random number is generated as a unique identifier by which to address a file, a verification hash function may still be used to verify the contents of a file and the same advantages would accrue. Simply put, an addressing hash function can be replaced by a random number generator that generates suitably large enough random numbers to be used as unique addresses for files.

Many of a wide variety of random number generators may be used. Knowledge and use of random number generators is well known in the art. By way of example, random number generating techniques that may be used include: generating pseudorandom numbers using seed values such as time, thermal or noise measurements, etc. The size of the random number generated will vary with each implementation and the needs of the system operator to insure uniqueness amongst all of the random numbers generated. It is anticipated that random numbers having at least 128 bits (in their binary form) would be needed to adequately insure that the risk of collisions is extremely low in public or semi-public applications (on the Internet, typically). In one particular embodiment, the random number generator generates 128-bit random numbers that are suitably long enough for avoiding collisions and would allow compatibility with a system that has implemented (or is implementing) a 128-bit addressing hash function. Of course, longer random numbers may also be used.

FIG. 12 illustrates a Table 500 containing verification hash values for any number of files as well as corresponding random numbers for the files. Table 500 is termed an "identifier authority" table in one embodiment. For a particular file contained in a database, Table 500 holds a random number for that file and a hash value for that file computed using a verification hash function. (Of course, an alternative embodiment may be used in which there is more than one verification hash function.) Table 500 includes column 504 random numbers (Rs) computed using a random number generator) and column 508 holding verification hash values (VHs) computed using a hash function. Each row corresponds to a given file. For example, row 514 corresponds to file W, and contains the R for file A. The VH for file A is computed using a 256-bit hash function, for example. Row 514 shows that for a particular file W, its R is stored associated with its VH, thus by reference to an R for a particular file its VH may be obtained, and vice versa.

Table 500 may have any number entries (or records) depending upon the number of files being stored. Table 500 may be associated with files stored on a single computer, on a network of computers, over a distributed network of computers, or in any database suitable for storing files or other digital information. Further, Table 500 may have its entries protected using hash functions, time stamps and or digital signatures as will be appreciated by those skilled in the art. Further, the R and VH for a particular file may be associated with each other using any other suitable data structure, and not necessarily a table.

Also included in Table 500 is an actual address column 512 useful for when duplicates of a file are added to the database. For example, after file Z has been added to the database and its R-VH pair has been added in row 520, it may be discovered that file Z is an exact duplicate of file X. This realization may occur as file Z is being added to the database or later during an optimization process. As a random number for file Z has already been generated, added to column 504, and been distributed to a user or application, it would be awkward to delete row 520 (or not to enter it) because various parties may be using the random number generated for file Z as the only means to reference it. In this situation, because it is not necessary to physically add file Z to the database (or perhaps file Z has been deleted), the random number for file X may be entered in column 512 of row 520 to indicate to one searching for file Z that the random number of file X should be used to address the file. Because file X and file Z are duplicates, using the random number for file X as an address is appropriate. Depending upon the implementation, a blank entry in column 512 (or another suitable flag) will indicate to the system that there is no other address that should be consulted. Of course, there may be many entries in Table 500 that all refer to the same file. In this case, only one copy of the file need be retained, and the entries in Table 500 for the copies of that file that have been deleted (or not added) would utilize column 512 to indicate the actual address of the file.

Figure 13:
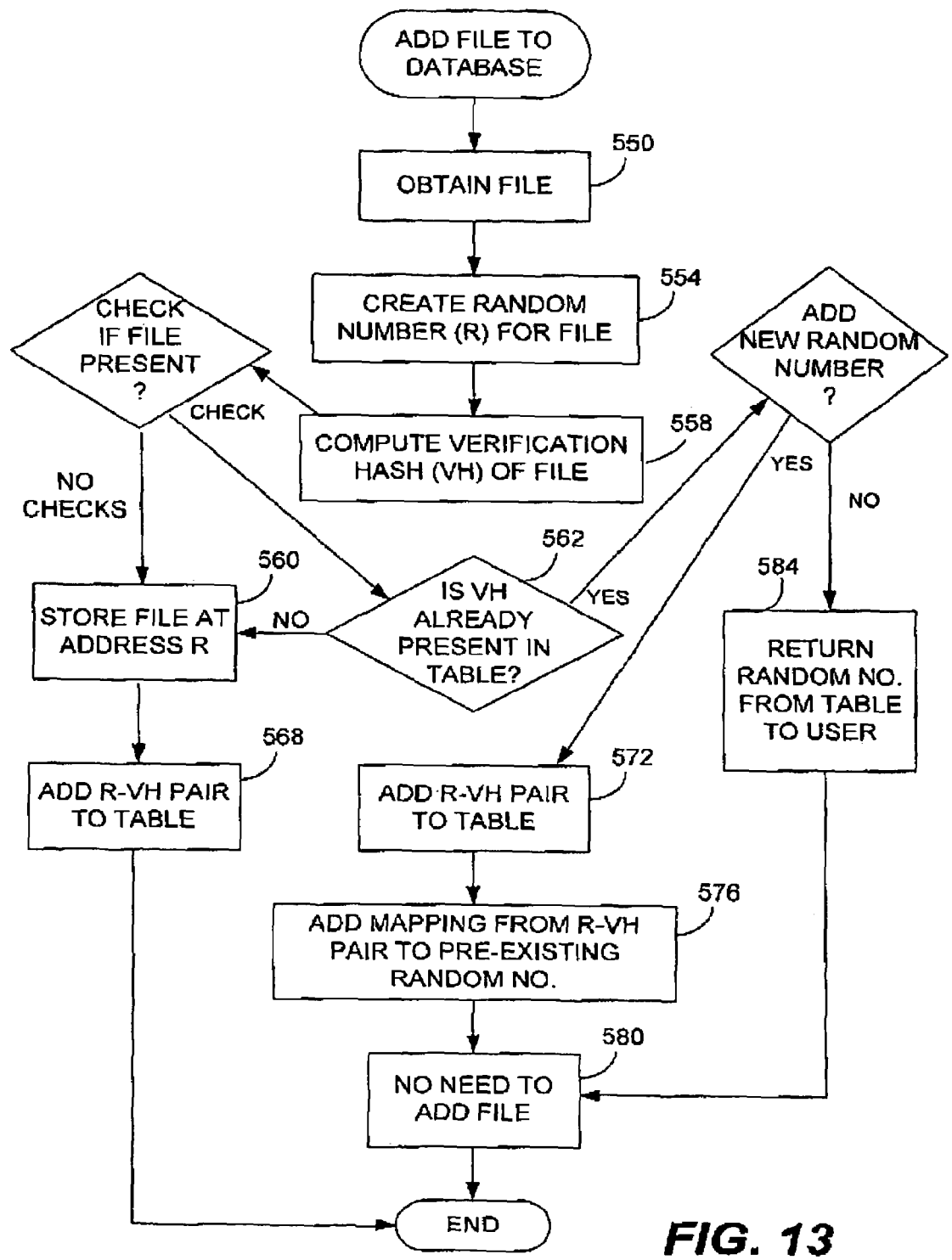
FIG. 13 is a flow diagram describing a technique for adding a file to the database in which the system uses a random number generator as the function to generate a unique address for each file.

FIG. 13 is a flow diagram describing a technique for adding a file to the database in which the system uses a random number generator as the function to generate a unique address for each file. In 550 a file to be added is obtained from a user or software application. In 554 a suitable random number generator is used to create a random number R for the file. This random number is preferably a string of bits suitably long enough to provide a unique address for each file added to the database. And as explained in the prior art and as shown in FIG. 1, this string of bits may be encoded to provide an easily user-readable identifier or to act as the file name for the file. Also as shown in FIG. 1, the random number may form part of a URL or other suitable identifier. In an alternative embodiment, step 554 need not be performed immediately upon obtaining the file, but may be performed in conjunction with step 560 or in conjunction with step 572. In 558 the verification hash function used by the system is used to compute the verification hash value (VH) of the file.

In an embodiment where it is not desirable to check whether the file is already present in the database (i.e., it is advantageous to simply add the file directly), step 562 is not performed and at 560 the file is then stored in the database at address R. In 568 R-VH pair is then added to the hash authority table, R is returned to the requester as the unique address for the file and the process ends.

In an embodiment where it is desirable to check whether the file to be added already exists within the database, step 562 compares the VH computed for the file with all of the VH values in column 508 of the table. If no match is found, this indicates that the file is not present and control moves to step 560 which adds the file and its R-VH pair as previously discussed. If a match is found, however, this indicates that a copy of the file is already present in the database and that an entry in the hash authority table already exists. In one embodiment there is no need to generate a new random number for the file and add a new entry into the table. Accordingly, in 584 the random number from the entry in the table corresponding to the VH match is returned to the user (or other application) as the unique address for that file in the database. In this embodiment, no new random number need be generated, no new entry need be added to the table and the file need not be added to the database because the file is already present in the database. Simply by finding an entry in the table having a VH that matches the VH computed in step 558, a random number used to identify the file is obtained by using the random number from the found entry. After 580 the process ends.

In another variation of step 562, there may be a situation in which a random number has already been generated for the file and has already been returned to the user or other software application. In this situation, if it is determined in 562 that there is a VH match and a copy of the file is already present in the database, it will still be desirable to add the R-VH pair to the table in 572. The R-VH pair is added to the table because the random number R has already been returned to the user to help reference the file in the future, thus it is necessary that there be an entry in the table corresponding to random number R. In this scenario, though, it is not strictly necessary to add another copy of the file, accordingly in 576 a mapping from the newly added R-VH pair to the pre-existing random number is added. There is no need to add a copy of the file because the file already exists in the database.

As an example, consider row 520 of Table 500 in which file Z is desired to be added to the database but in 562 it is determined that file Z is an exact copy of file X. (Because the VH of file Z matches the VH of file X it can be determined that the files are the same). File Z need not be added to the database because file X is already present, but in 572 row 520 is added to the table providing the newly generated random number R for file Z (created in 554) and the VH for file Z. In 576, the random number for file X from column 504 is added to column 512 at row 520 in order to provide the mapping from the random number for file Z to the actual address of the file. Of course, should it be desired to actually add file Z (a duplicate of file X) it would not be necessary to perform step 576 and make use of column 512 because the random number for file Z in column 504 would then accurately identify file Z within the database. After 580 the process ends.

An optimization embodiment handles multiple copies of a file in a database implemented using a random number generator. In this optimization, multiple copies of a given file in the database are deleted leaving only a single copy of the file in a database. This optimization may be performed by looping through all entries in identifier authority table 500 looking for VH values that match. VH values in column 508 that match indicate copies of the same file. Algorithms for looping through a list of entries in a table looking for matches are known to those skilled in the art. Once two or more matches are found for a particular file, the random numbers in column 504 are used to address each of the copies of the file and to delete multiple copies as appropriate. Preferably, a single copy of the file is retained and each R-VH pair entry in the table is also retained. Each entry is retained because the address R for each file may have already been distributed to users and applications who will rely on this address to reference the file in the future. Finally, the identifier authority table is updated in order to map entries whose files have been deleted to the single remaining copy of the file. For example, as previously explained, should file X and file Z be copies and should file Z be deleted from the database, the entry at row 520 is retained but a mapping at column 512 is added to map the random number for file Z into the random number for file X, thus allowing any user with the address R for file Z to find a copy of this file at the address R for file X. Of course this technique works for multiple copies of a given file as well.

Figure 14:
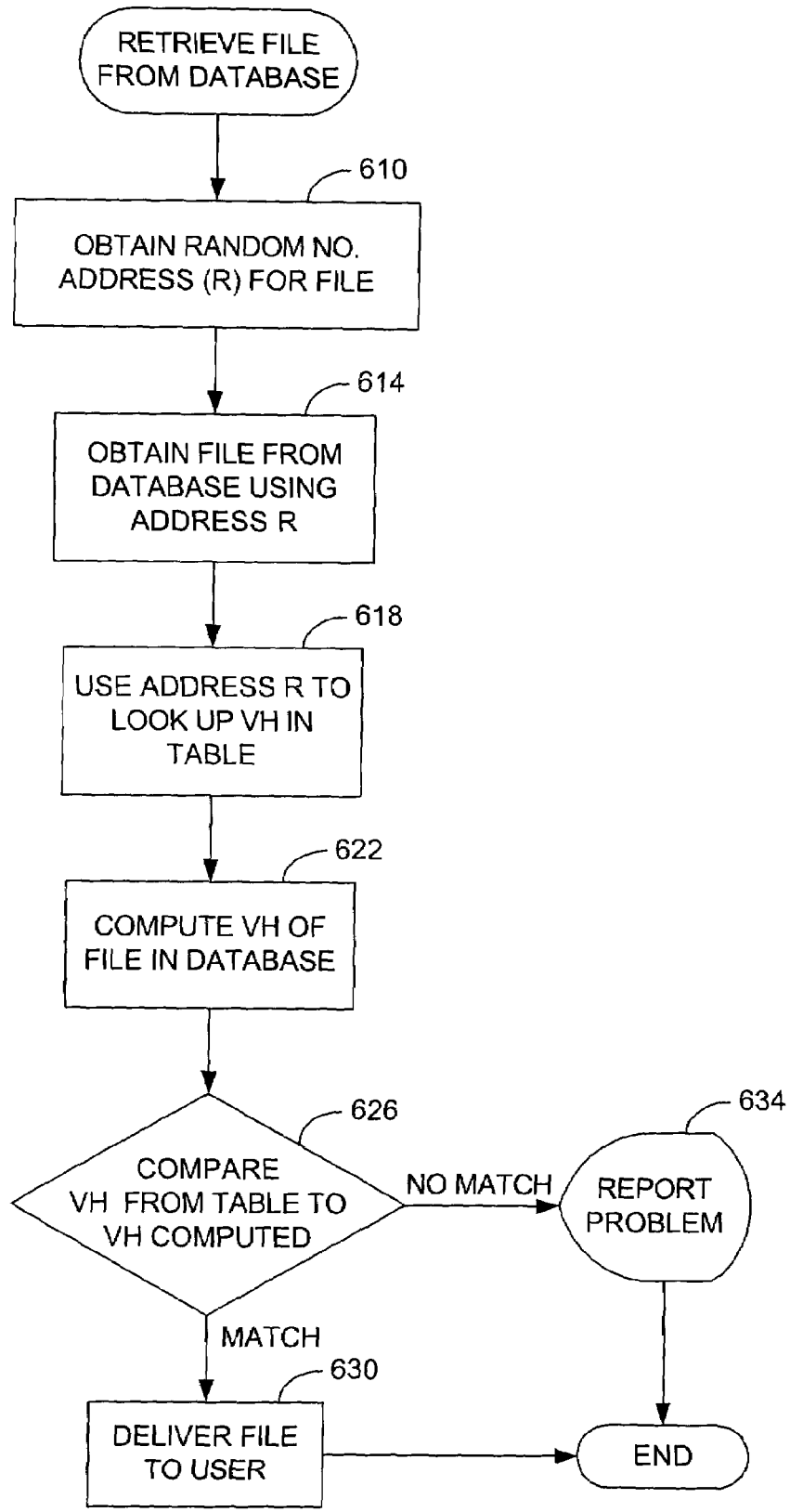
FIG. 14 is a flow diagram describing a technique of retrieving a file from a database in which a random number is used to identify the file.

FIG. 14 is a flow diagram describing a technique of retrieving a file from a database in which a random number is used to identify the file. In this situation, a user wishes to retrieve a file from the database. In 610 a user or software application desires a particular file and will ask for that file based on a previously stored random number (R) for that file. The R for the desired file is obtained by the user or application from any suitable source that has stored the R. The user or application presents this R of the desired file to the system. In 614 the system uses the R to determine if the desired file is present in the database by using the R as the address of the file, or perhaps as its file name. The identifier authority table is consulted in 618 to look up the VH for the file.

In 622 the verification hash value (VH) of the file found in the database is computed. In 626 this computed VH is compared to the VH for this file from the entry in the identifier authority table. If the VH values are different, then in 634 a problem is reported to the user indicating the same possible problems as described in step 252, except that a hash collision in this case is not possible because a hash function has not been used to calculate an address for the file (a random number has been used). If the VH values are the same, this indicates that the file found at address R is the same file that was originally stored at this location when the file was first added to the database. Equivalent VH values in this step reliably indicate that the file found is the file desired by the user. In 630 the file is delivered to the user or software application requesting it.

FIG. 15 illustrates one embodiment of an identifier authority table 840 in which the previously described additional security techniques are also applicable to the embodiment in which a random number is used to uniquely identify a file. The additional techniques may be used when a record is added (i.e., when a file or new R-VH pair is added), or when a record is changed (e.g., when an actual address is added). For example, time stamp 848 would be applied to columns 842-846 and digital signature 850 would include all of the previous columns in addition to the digital signature of the previous record. Of course, variations on which fields are included in the time stamp and digital signature are also possible.

Computer System Embodiment

The present invention may be implemented on a wide variety of computers. In one contemplated embodiment, the computer hardware used to store and retrieve documents is a Centera brand computer available from EMC Corporation of Hopkinton, Mass. The Centera product description guide describes this computer and its software, and is available at http://www.emc.com/pdf/products/centera/centera_guide.pdf, and is hereby incorporated by reference. The system software may be written using Linux and JAVA. In this embodiment, it is contemplated that the Centera computers are the back end of a web site that allows a user to supply message digests via a URL, such as shown in FIG. 1. System software operating on a web site server interface between the Centera and a user, and allow file insertion and retrieval as herein described. In the embodiment involving use of a random number generator, implementation may be on any general purpose computer, and Linux may also be used in conjunction with the .NET and C# ("C Sharp") languages available from Microsoft Corporation.

In other embodiments, the document storage, system software and user interface are all resident on a single computer. In yet other embodiments, a service provider provides the front end user interface over the Internet that interfaces with a user, but then searches for documents identified by message digests over the Internet or other worldwide network, rather than storing the documents itself. Or, a totally distributed peer-to-peer system is based solely on content-addressable storage to retrieve and guarantee its content.

Figure 16A:
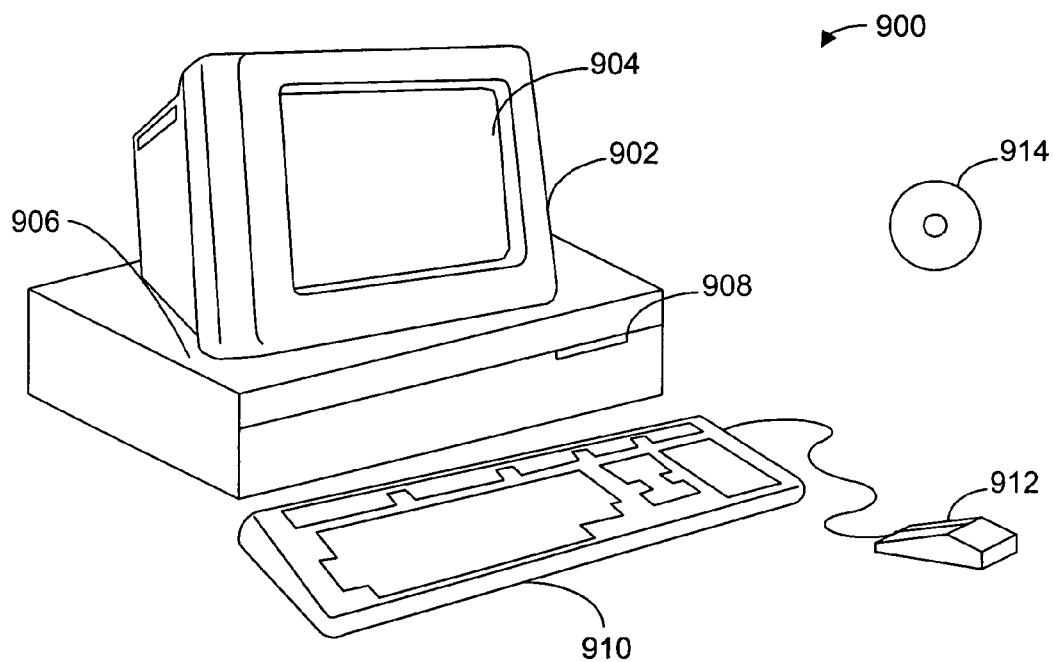
FIGS. 16A and 16B illustrate a computer system suitable for implementing embodiments of the present invention.
Figure 16B:
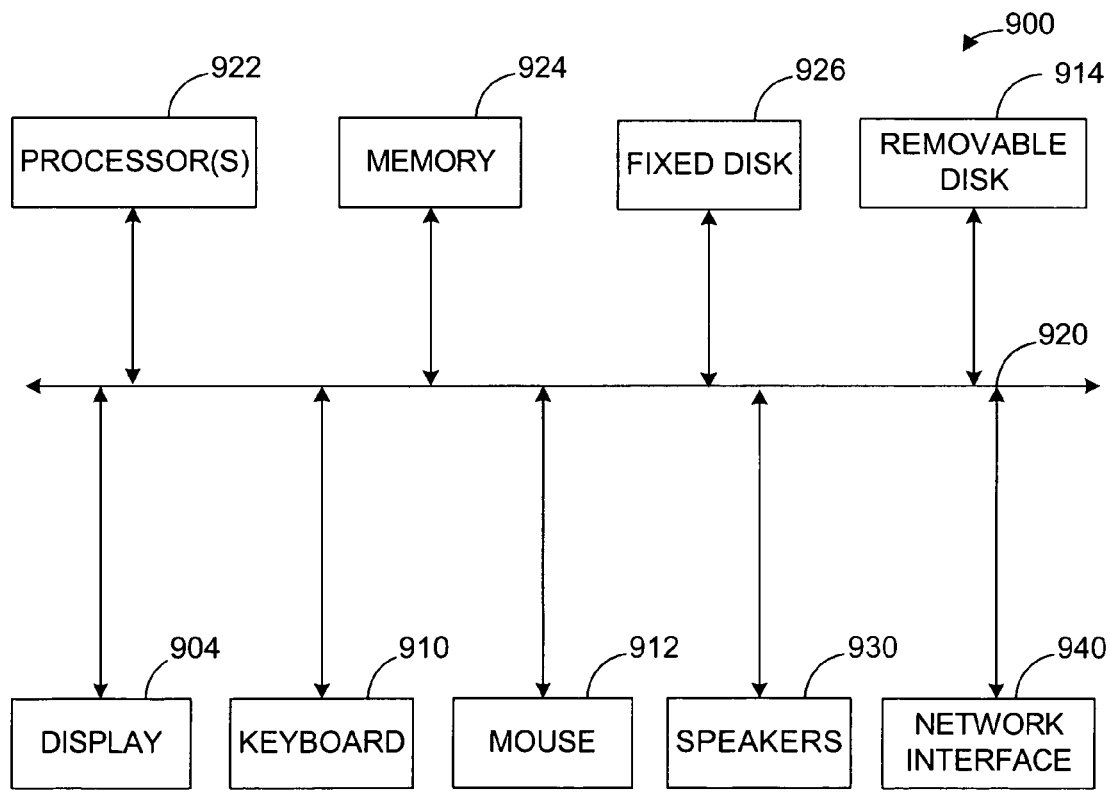

FIGS. 16A and 16B illustrate a computer system 900 suitable for implementing embodiments of the present invention. FIG. 16A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 16B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. A method of retrieving a desired computer file from a database, said method comprising:
   obtaining a unique identifier for said desired computer file, said unique identifier used to identify a unique location in said database;
   retrieving a stored file from said database using said unique identifier as a reference;
   retrieving a unique identifier-verification hash value pair from a data structure associated with said database by using said unique identifier, wherein said retrieved verification hash value has been previously derived from said stored file using a verification hash function, said retrieved verification hash value being different from said unique identifier;
   computing a verification hash value for said stored file using said verification hash function;
   comparing said computed verification hash value to said retrieved verification hash value; and
   determining that said stored file is said desired file when said computed verification hash value matches said retrieved verification hash value, said computed verification hash value being used to verify the contents of said stored file, whereby said desired file is retrieved from said database.

2. A method as recited in claim 1 further comprising:
   receiving a request from a user to retrieve said desired file, said request including said unique identifier; and
   when it is determined that said stored file is said desired file, delivering said stored file to said user.

3. A method as recited in claim 1 further comprising:
   performing said step of retrieving a stored file by searching said data structure for said unique identifier.

4. A method as recited in claim 1 wherein said data structure is a table, a list or a tree data structure.

5. A method as recited in claim 1 wherein said unique identifier is an identifying hash value computed from said file using an identifying hash function, is a random number generated using a random number generator, or is a pseudo random number generated using a pseudo random number generator.

6. A method as recited in claim 1 wherein said verification hash value is a unique, content-based identifier.

7. A method as recited in claim 1 wherein said unique identifier is computed from a first hash function, and wherein said verification hash function provides stronger security than said first hash function.

\* \* \* \* \*